United States Patent

Saunders

[11] Patent Number: 5,781,197
[45] Date of Patent: Jul. 14, 1998

[54] METHOD FOR MAINTAINING CONTIGUOUS TEXTURE MEMORY FOR CACHE COHERENCY

[75] Inventor: Bradley L. Saunders, Fort Collins, Colo.

[73] Assignee: Hewlett-Packard Company, Palo Alto, Calif.

[21] Appl. No.: 690,432

[22] Filed: Jul. 26, 1996

[51] Int. Cl.$^6$ ............................................. G06T 15/00
[52] U.S. Cl. ............................. 345/430; 345/429
[58] Field of Search ............................. 345/419, 420, 345/423, 424, 425, 429, 430

[56] References Cited

FOREIGN PATENT DOCUMENTS

| 0749100A2 | 5/1996 | European Pat. Off. . |
| 2240015 | 7/1991 | United Kingdom . |
| 2240016 | 7/1991 | United Kingdom . |
| 2288304 | 10/1995 | United Kingdom . |

OTHER PUBLICATIONS

Dave Arns & John Fujii, "HP PEX Texture Mapping", Aug. 1994, http://www.hp.com/mhm/WhiteaPapers/PEXture Mapping/PEXture Mapping.html.

*Primary Examiner*—Phu K. Nguyen
*Assistant Examiner*—Cliff N. Vo

[57] ABSTRACT

The invention provides a method for downloading texel data into a contiguous block of memory in a computer graphics system. The texel data for the first level is downloaded, and from the memory map level number and the size of the MIP map, the amount of contiguous memory needed is allocated for a contiguous block of memory for all of the MIP map levels associated with the texture. Then, the data for the first MIP map is placed into the contiguous memory in the appropriate location for the level number based upon a computed offset value. As additional MIP map levels are downloaded, if they have level numbers and sizes which are consistent with the first downloaded MIP map, an offset value is computed, based upon their level number, and they are placed into the appropriate location in the contiguous memory block. Alternatively, if a MIP map is downloaded which is not consistent with the data previously downloaded, it is placed into temporary memory, and a flag is set. Each time the base level data is downloaded for a particular texture, if there is a consistent set of data which was not in contiguous memory, it is placed into contiguous memory.

1 Claim, 6 Drawing Sheets

METHOD FOR MAINTAINING CONTIGUOUS TEXTURE MEMORY FOR CACHE COHERENCY

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to a method for maintaining cache coherency in a computer graphics system. In particular, the invention relates to software memory management of texture maps of a texture mapping computer graphics system and, more particularly, to a new approach which considerably speeds up the system by assuring that all of the texture data is maintained in contiguous memory.

Current implementations of texture mapping, as described in greater detail in U.S. patent application Ser. No. 08/486, 447 filed Jun. 8, 1995 entitled TEXEL CACHE INTERRUPT DAEMON FOR VIRTUAL MEMORY MANAGEMENT OF TEXTURE MAPS, by Ethan W. Gannett, which is assigned to the present assignee, the contents of which are incorporated herein by reference, store a copy of the user's texture in software to provide a mechanism for texture inquiry and to allow cacheing of texels in hardware when there is not enough memory to fit all of the texels into the hardware at one time.

In typical computer graphics systems, an object to be represented on the display screen is broken down into a plurality of graphics primitives. Primitives are basic components of a graphics picture and may include points, lines, vectors, and polygons, such as triangles. Typically, a hardware/software scheme is implemented to render, or draw, on the two-dimensional display screen, the graphics primitives that represent the view of one or more objects being represented on the screen.

Typically, the primitives that define the three-dimensional object to be rendered are provided from a host computer, which defines each primitive in terms of primitive data. For example, when the primitive is a triangle, the host computer may define the primitive in terms of the x,y,z coordinates of its vertices, as well as the R,G,B color values of each vertex. Rendering hardware interpolates the primitive data to compute the display screen pixels that are turned on to represent each primitive, and the R,G,B values for each pixel.

Early graphics systems failed to display images in a sufficiently realistic manner to represent, or model, complex three-dimensional objects. The images displayed by such systems exhibited extremely smooth surfaces absent textures, bumps, scratches, shadows, or other surface details present in the object being modeled.

As a result, methods were developed to display images with improved surface detail. Texture mapping is one such method that involves mapping a source image, herein referred to as a "texture" onto a surface of a three-dimensional object, and thereafter mapping the textured three-dimensional object to the two-dimensional graphics display screen to display the resulting image. Surface detail attributes which are commonly texture mapped include color, specular reflection, vector perturbation, specularity, transparency, shadows, surface irregularities and grading.

Texture mapping involves applying one or more point texture elements ("texels") to each point element ("pixel")

2 of the displayed portion of the object to which the texture is being mapped. Texture mapping hardware is conventionally provided with information indicating the manner in which the texels in a texture map correspond to the pixels on the display screen that represent the object. Each texel in a texture map is defined by S and T coordinates which identify its location in the two-dimensional texture map. For each pixel, the corresponding texel or texels that map to it are accessed from the texture map, and incorporated into the final R,G,B values generated for the pixel to represent the textured object on the display screen.

It should be understood that each pixel in an object primitive may not map in a one-to-one correspondence with a single texel in the texture map for every view of the object. For example, the closer the object is to the view port represented on the display screen, the larger the object will appear. As the object appears larger on the display screen, the representation of the texture becomes more detailed. Thus, when the object consumes a fairly large portion of the display screen, a large number of pixels are used to represent the object on the display screen, and each pixel that represents the object may map in a one-to-one correspondence with a single texel in the texture map, or a single texel may map to multiple pixels. However, when the object takes up a relatively small portion of the display screen, a much smaller number of pixels is used to represent the object, resulting in the texture being represented with less detail, so that each pixel may map to multiple texels. In addition, each pixel may map into multiple texels when a texture is mapped to a small portion of an object. Resultant texel data is calculated for each pixel that maps to more than one texel. As it is common for a pixel to map to multiple texels, resultant texel data for a pixel typically represents an average of the texels that map to that pixel.

Texture mapping hardware systems typically include a local memory that stores data representing a texture associated with the object being rendered. As discussed above, a pixel may map to multiple texels. If it were necessary for the texture mapping hardware to read a large number of texels that map to a pixel from the local memory to generate an average value, then a large number of memory reads and the averaging of many texel values would be required, which would be time consuming and would degrade system performance.

Figure 1:
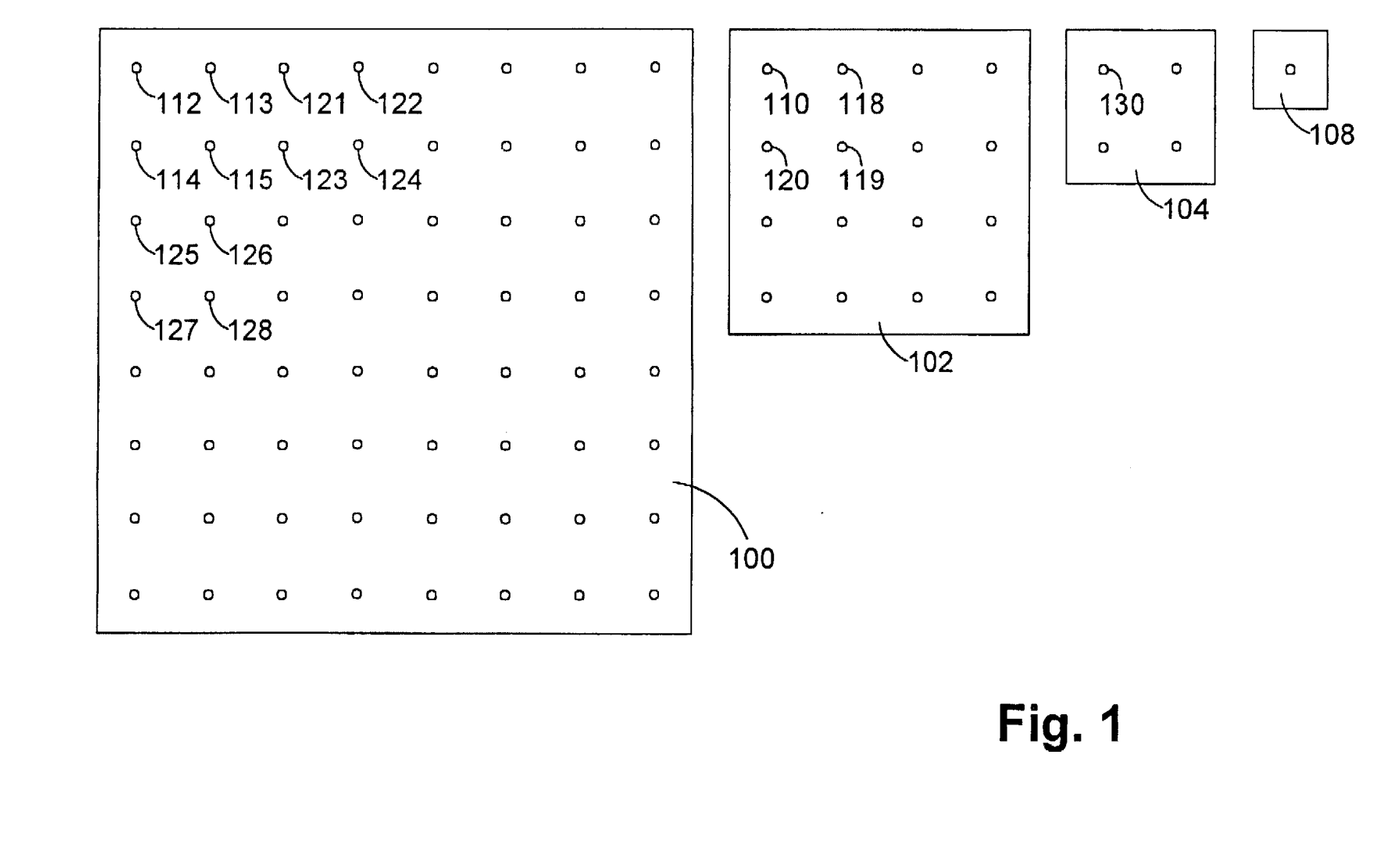
FIG. 1 illustrates is a graphical illustration of a set of texture MIP maps.

To overcome this problem, a scheme has been developed that involves the creation of a series of maps, called "MIP" (meaning "multum in parvo"-many things in a small place) maps, for each texture, and storing the MIP maps of the texture associated with the object being rendered in the local memory of the texture mapping hardware. A MIP map for a texture includes a base ("Level 0") map that corresponds directly to the texture map, as well as a series of filtered maps, wherein each successive map is reduced in size by a factor of two in each of the two texture map dimensions. An illustrative example of a set of MIP maps is shown in FIG. 1. The MIP maps include a base map ("Level 0") 100 that is eight-by-eight texels in size, as well as a series of maps 102, 104 and 108 that respectively represent Level 1, which is four-by-four texels; Level 2, which is two-by-two texels; and Level 3, which is one texel in size.

The Level 1, four-by-four, map 102 is generated by box filtering (decimating) the base map 100, such that each texel in the Level 1 map 102 corresponds to an average of four texels from the Level 0 base map 100. For example, the texel 110 in Level 1 map 102 equals the average of the texels 112–115 in Level 0 (base) map 100. Similarly, texels 118 and 120 in Level 1 map 102 equal the averages of texels 121–124 and 125–128 in Level 0 (base) map 100, respectively. The two-by-two, Level 2, map 104 is similarly generated by box filtering Level 1 map 102, such that texel 130 in Level 2 map 104 equals the average of texels 110 and 118–120 in Level 1 map 102. The single texel in Level 3 map 108 is generated by averaging the four texels in Level 2 map 104.

Conventional graphics systems generally download, from the main memory of the host computer to the local memory of the texture mapping hardware, the complete series of MIP maps for any texture that is to be used with the primitives to be rendered on the display screen. As will be understood by those skilled in the art, a complete series of MIP maps means all of the MIP maps, from Level 0 to Level N, where Level N is a 1×1 MIP map. Thus, the texture mapping hardware can access texture data from any one of the Levels of the series of MIP maps. The determination of which map to access to provide the texel data for any particular pixel is based upon the number of texels to which the pixel maps. For example, if the pixel maps in one-to-one correspondence with a single texel in the texture map, then the base map 100 is accessed. However, if the pixel maps to four, sixteen or sixty-four texels, then the maps 102, 104 and 108 are respectively accessed, because those maps respectively store texel data representing an average of four, sixteen and sixty-four texels in the texture map.

As will be recognized, a series of texture MIP maps can require a large amount of system software memory for storage. For example, a series of MIP maps for a texture having a texture base map of 1024×1024 texels requires more than five megabytes of system software memory to store one copy of the MIP mapped texture. Thus, the multiple stored copies of the MIP mapped texture use a significant amount of system software memory.

While system software memory may be able to store up to a few gigabytes of software data, yet another issue which must be addressed is where the MIP maps are actually stored. In particular, in order to achieve high speed rendering of graphics images, it is important to be able to transfer the texel information from the appropriate level of the MIP map to the graphics display as quickly as possible. While it would be best if the location of all of the levels were known in advance, the way that a typical graphics application programmer interface ("API") operates makes that a particularly difficult task. In particular, a graphics API called "OpenGL", available from Hewlett Packard, allows the user to download MIP map levels in such a way that the various levels can be sent to memory in any (Level) order.

Heretofore, such MIP map levels were stored individually in memory, using as the location for each of the levels the memory returned by an operating system memory allocating ("mallocing") routine. Thus, the actual locations in memory where levels of the MIP map would be stored was left to the operating system. Accordingly, when an individual level was needed, it had to be located, resulting in a general slowdown of the operation of the system.

SUMMARY OF THE INVENTION

In accordance with the preferred embodiment of the invention, a mechanism is provided whereby it is possible to store levels of a mipped OpenGL texture map into contiguous memory, while maintaining data integrity. Thus, the present invention reduces or eliminates memory cache misses when downloading a fully mipped texture map down to hardware, or when texture mapping using software rasterization. Also, the present invention maintains the integrity of the data being down-loaded, even if the data does not fit the description of the current full MIP map.

In accordance with the invention, an algorithm is provided which is able to compute the total memory needed to store a full MIP map based on the first level that is passed to the graphics core as well as on subsequent base map level changes. Each level is then stored into the contiguous memory, if the level is valid, or in a temporary memory location, if the level is not valid. Each time the base level changes, all levels are tested for validity, and the valid levels, are placed into the contiguous memory.

DETAILED DESCRIPTION OF THE PREFERRED EMBODIMENT OF THE INVENTION

Attached hereto, and incorporated herein, is an Appendix which contains the source code (in the C programming language) for the preferred embodiment of the invention. While it is believed that the source code adequately describes the details of the invention such that one skilled in the computer graphics art will be able to readily understand the present invention, additional details of the invention are described with reference to the flow charts of FIGS. 2–6, which illustrate the procedure used by the invention.

Figure 2:
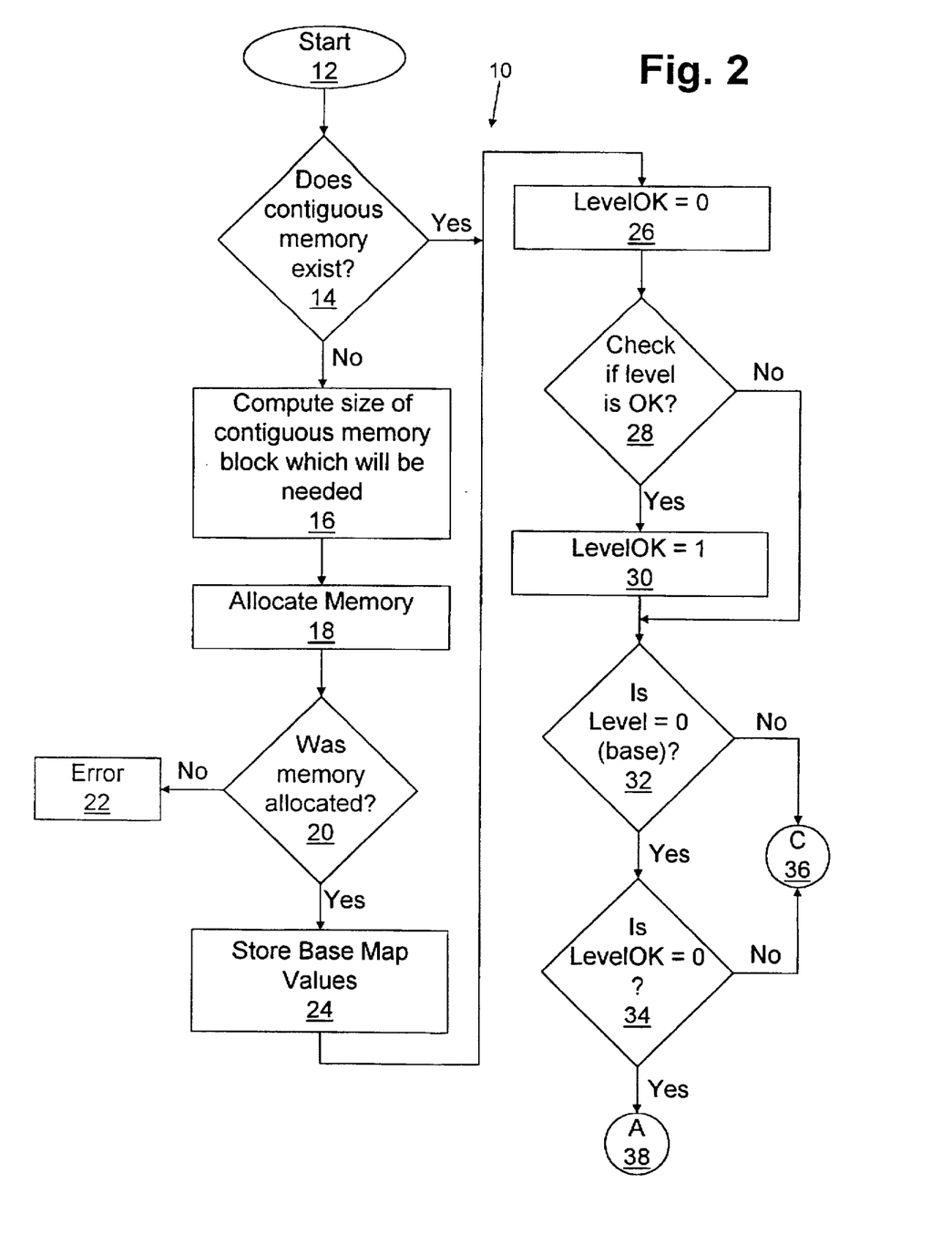
FIGS. 2–6 are a flow chart illustrating the method of the present invention.

Referring, therefore, to FIGS. 2, the flow chart is generally referred to as the overall method 10. In accordance with the present invention, in the performance of the inventive method 10, it is an objective that the texture data be placed into a contiguous block of memory. As set forth above, the texture data consists of the data associated with all of the levels, from Level 0 to Level n, where Level n is a 1×1 array. For the sake of this explanation, it is sufficient to note that the first thing that must be determined is whether sufficient memory exists to place all of the texel data into a single block of memory. With reference to FIG. 2, this determination is illustrated by decision block 14. If it is not known whether there is sufficient memory, then we must compute the size of the contiguous memory block which will be needed 16, and the memory must be allocated 18. By way of example, if the Level 0 MIP map is an 8×8 map, it occupies 64 "positions", where the actual amount of memory would be determined by the number of bytes per texel (times 64). Thus, the Level 1 MIP map would occupy 4×4, or 16 positions; the Level 2 MIP map would occupy 2×2, or 4 positions; and the Level 3 MIP map would occupy 1×1, or 1 position. Thus, the total number of positions would be 85 "positions" times the number of bytes per texel. As will be readily understood, knowledge that the Level 2 MIP map is a 2×2 map, means that the base map is an 8×8 map. Accordingly, given the level and the size of a MIP map, one can readily determine the size of a contiguous memory block which will be needed to store the full MIP map.

If it is determined that sufficient memory could not be allocated 20, an error condition 22 will result. Alternatively, the base map (Level 0) values will be stored 24. Next, a flag, called "LevelOK" is set to "0" at 26, in the preferred embodiment of the invention, and then a check is made to determine if the Level information is OK 28. By this, what is meant is that a determination is made as to whether or not the information associated with the MIP map level being loaded is consistent with the information previously known about the MIP map. By way of example, if a "Level 1" MIP map having a size of 4×4 was downloaded, and then a Level 0 MIP map having a size of 8×8 was downloaded, the data would be consistent, and the level would be OK. Alternatively, if a "Level 1" MIP map having a size of 4×4 was downloaded, and then a Level 0 MIP map having a size of 4×4 was downloaded, the data would not be consistent, and the level would not be OK. If it is determined that the data is consistent with data previously downloaded, then the LevelOK flag is set to "1", at 30.

If the LevelOK flag is "0", then a check is made 32 to determine if the MIP map was for the base map (Level 0). If not, or if so and if the LevelOK flag was equal to "1", then we will go to point "C" 36 (See FIG. 5). If the MIP map is for the base map (Level 0), then if the LevelOK flag is set to "1", at step 34, we will go to point "A" 38 (See FIG. 3), and store the base level information 50 and a pointer to the existing memory 40.

Figure 3:
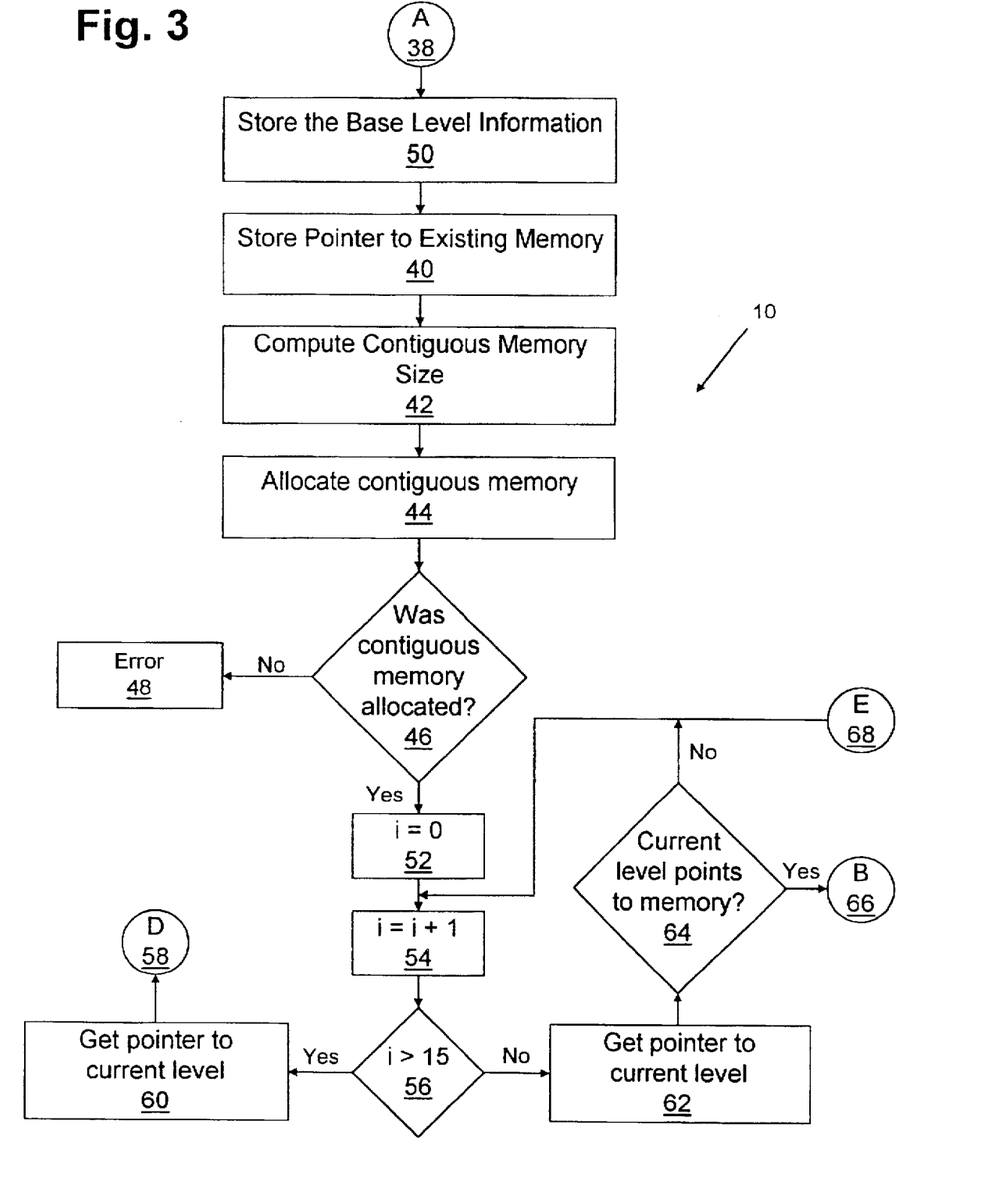

With continued reference to FIG. 3, the size of contiguous memory is next computed 42, and contiguous memory is allocated 44. Following a test to determine whether contiguous memory was properly allocated 46, if it was determined that there was an error 48, we can do no more. A counter 52, an incrementer 54, and a test procedure 56 are set up to allow for the repeated iteration through a loop. In the preferred embodiment of the invention, the loop comprises the steps, getting a pointer to the current level 62, and determining that the current level still does not point to any location in memory 64. This loop is iterated repeatedly, and each time the loop counter 54 is incremented until the loop counter indicates that the loop has been iterated the maximum number of potentially supported levels. In the current embodiment of the invention, based upon currently used hardware and memory capacities, no more than sixteen levels are supported. Accordingly, the loop can be processed no more than fifteen times, although those skilled in the art will recognize that this number would be increased if future hardware and memory availability dictated the use of a greater number of MIP map levels.

If it is determined that the current level points to memory in the decision box 64, then the size of the current level is computed 70, and a variable, LevelOK, indicating that the level data is correct, it is initialized to "0", at step 72, indicating that the data is not known to be correct.

Figure 4:
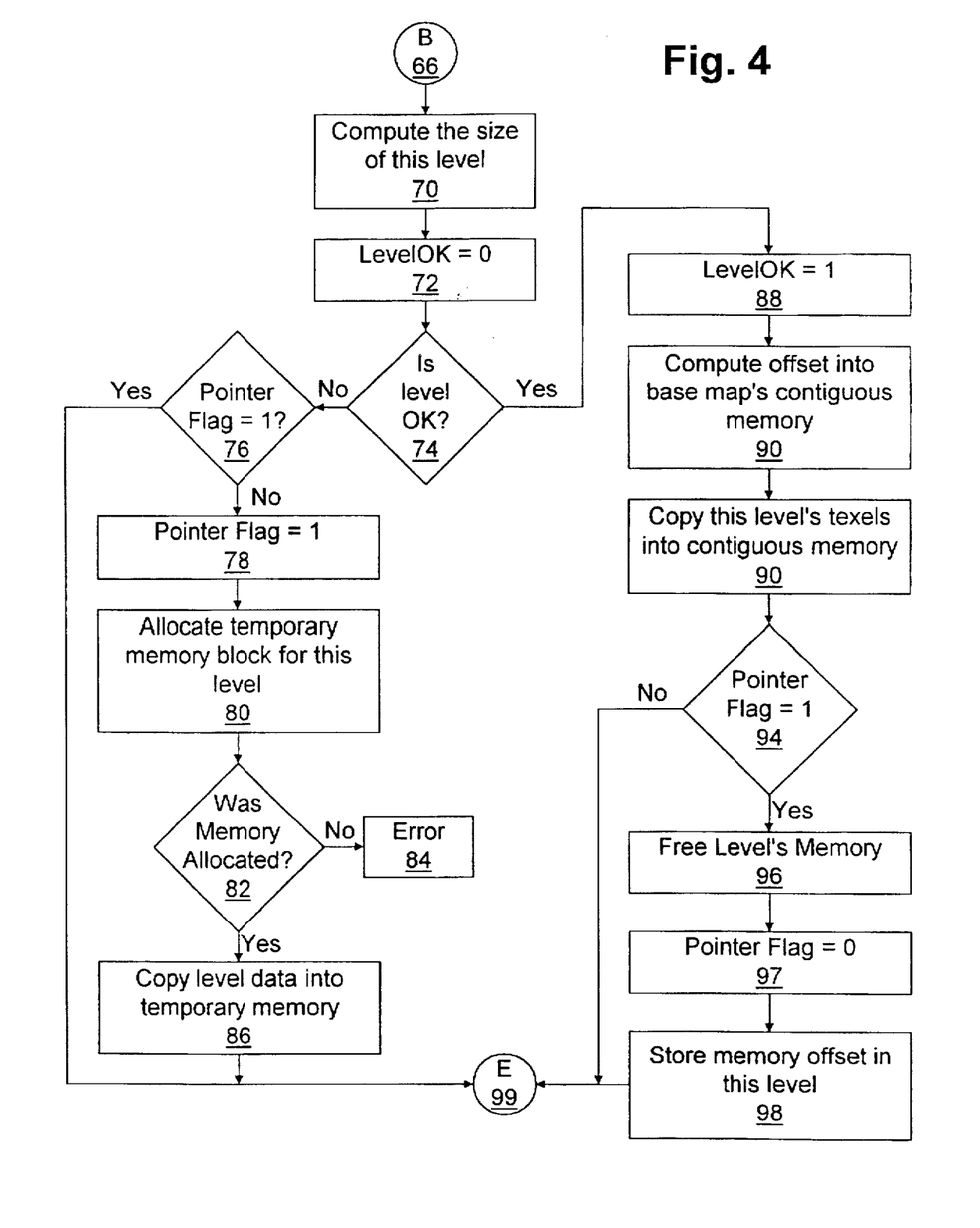

The level data is then tested for accuracy 74, and if a determination is made that the level data is accurate, then LevelOK is set to "1", at step 88, indicating that the level data is accurate, and an offset into the base map's contiguous memory is computed for the level 90. Then, the texels for the current level are copied into the appropriate locations in the contiguous memory 92.

At this point, a test is made to determine if the pointer flag was set to "1", at step 94, and if not, we reenter the loop referred to above (See FIG. 3), at point "E". If, on the other hand, the pointer flag was set to "1", then we will free the memory for this level 96, reset the pointer flag to "0", at step 97, and store the memory offset in the current level 98. Then we will reenter the loop referred to above (See FIG. 3), at point "E".

Alternatively, if it was determined that the level data was not correct, at step 74, and if the pointer flag was set to "1" then decision box 76 will direct us to reenter the loop referred to above (See FIG. 3), at point "E".

On the other hand, if it was determined that the level data was not correct at step 74, and if the pointer flag was set to "0", then decision box 76 will cause the process to set the pointer flag to "1" at step 78, allocate a temporary memory block for this level 80, and confirm that the memory was properly allocated 82. If an error occurred in the allocation of memory then nothing further can be done 84. Alternatively, this level's data is then copied into temporary memory and we will reenter the loop referred to above (See FIG. 3), at point "E".

Figure 5:
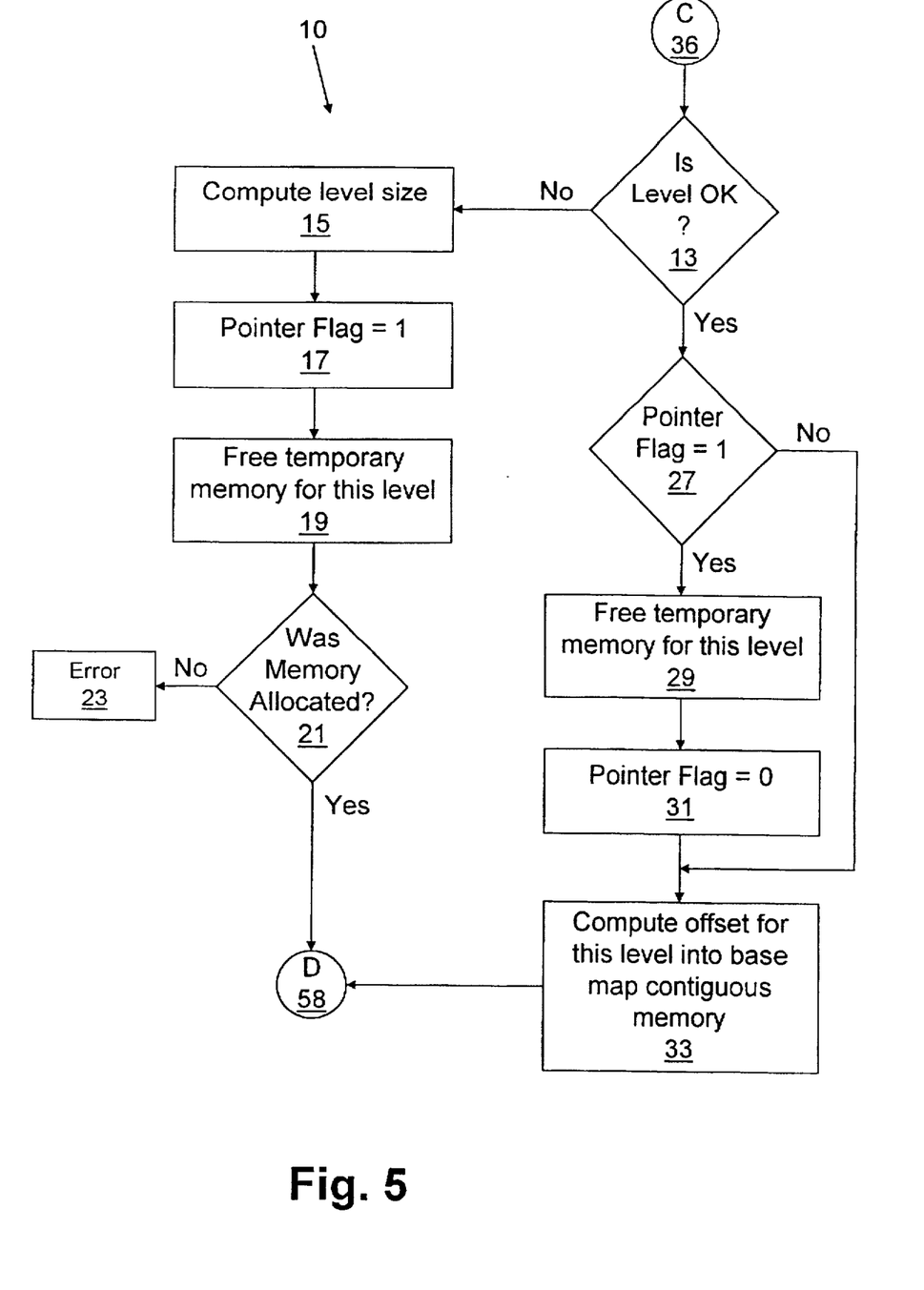

Referring again to FIG. 2, if it was determined at step 32 that we were not at the base level, then we went on to point "C" 36 in the process (See FIG. 5). Alternatively, we went on to point "C" 36 in the process, if we were at the base level at step 32, but the flag LevelOK was not set to "0", at step 34.

Referring now to FIG. 5, from point "C" 36, the next step 13 is to determine whether the level information is correct. If not, then we compute the level size 15, set the pointer flag to "1" 17, and allocate a temporary memory block for this level 19. Next, we confirm that the memory was properly allocated 21. If an error occurred in the allocation of memory then nothing further can be done 23. Alternatively, we go on to point "D" 58.

At point "C" 36 in the process, if we determined that the level information was correct at step 13, we check if the pointer flag was set to "1" at step 27. If so, then we free temporary memory for this level 28, set the pointer flag to "0" at step 31, and compute an offset for this level into the contiguous memory 33. Then we go on to point "D" 58.

If the pointer flag was "0" at step 27, then we only need to compute an offset for this level into the base map's contiguous memory 33, before going on to point "D", step 58.

Referring again to FIG. 3, after the loop has completed its fifteenth iteration, then the old contiguous memory is freed, at step 60, the loop will exit at 56, and the process will continue at "D", in step 58

Figure 6:
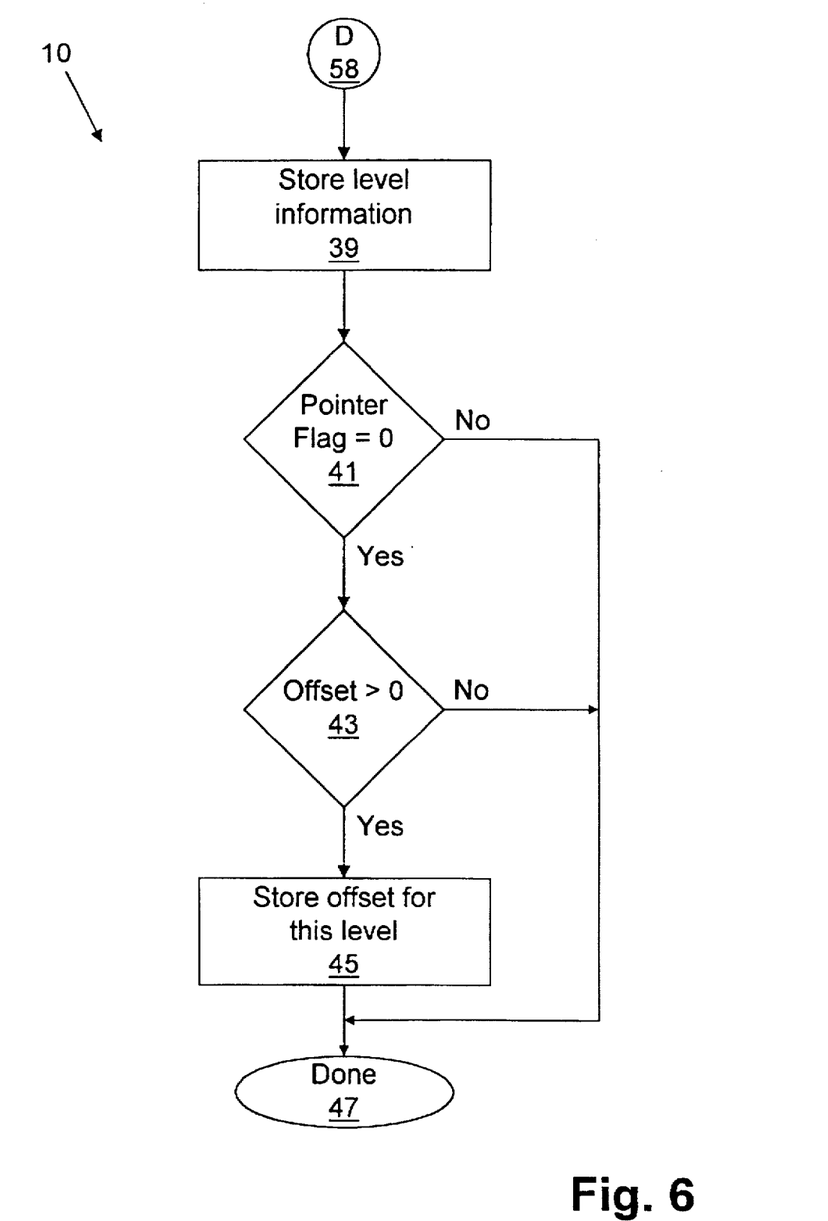

When we arrive at point "D", step 58 in the process, we store level information 39, and then we determine, at step 41, whether the pointer flag is set to "1". If so, then we are done 47. If the pointer flag was set to "0", then we check, at step 43, whether the offset is greater than "0". If the offset is "0", then we are done 47. If the pointer flag was "0" and the offset is greater than "0", then we must store the offset for this level 45, and then we are done 47.

Given the procedure of the present invention, as described above, with reference to FIGS. 2–6, and with reference to the C language code in the Appendix, it is now possible to go through some specific examples of how the invention operates. In each of the following examples, a download sequence will be given, and each download sequence will include a Level No., a Level Size (width×height), and a Pointer Flag value for the level.

EXAMPLE 1

| Level No. | Level Size (w, h) | Pointer Flag |
|---|---|---|
| 0 | 8 × 8 | 0 |
| 1 | 4 × 4 | 0 |
| 2 | 2 × 2 | 0 |
| 3 | 1 × 1 | 0 |

In Example 1, four level maps, corresponding to Levels 0, 1, 2, and 3 are downloaded, and they are respectively 8×8, 4×4, 2×2, and 1×1 maps. Thus, upon the downloading of the first level map, for Level 0 (i.e., the base map), the entire block of contiguous memory can be allocated, and there are no problems. This is the easiest case, as all of the Levels were downloaded, in order, and all of the Level Sizes, were entirely consistent.

EXAMPLE 2

| Level No. | Level Size (w, h) | Pointer Flag |
| --- | --- | --- |
| 2 | 1 × 1 | 0 |
| 1 | 2 × 2 | 0 |
| 0 | 4 × 4 | 0 |

In Example 2, three level maps, corresponding to Levels 2, 1, and 0 are downloaded, and they are respectively 1×1, 2×2, and 4×4 maps. Thus, upon the downloading of the first level map, for Level 2, the entire block of contiguous memory can be allocated, and upon the further, consistent, downloading of Levels 1 and 0, it can be seen that no problems were encountered. Again, all of the Level Nos. and Level Sizes, were entirely consistent.

EXAMPLE 3

| Level No. | Level Size (w, h) | Pointer Flag |
| --- | --- | --- |
| 0 | 4 × 4 | 0 |
| 1 | 16 × 16 | 1 |
| 2 | 1 × 1 | 0 |
| 1 | 2 × 2 | 0 |

In Example 3, four level maps, corresponding to Levels 0, 1, 2, and 1 were downloaded, and they are respectively 4×4, 16×16, 1×1, and 2×2 maps. Thus, upon the downloading of the first level map, for Level 0 (i.e., the base map), the entire block of contiguous memory was allocated, and it was assumed that we would receive additional level maps wherein Level 1 would be a 2×2 map, Level 2 would be a 4×4 map, etc. Note, that we do not know how many maps we will receive. However, upon the downloading of a Level 1 16×16 map, we realize that there is an inconsistency. Accordingly, the Level 1 16×16 map is placed into temporary memory, and the pointer flag is set to 1, indicating that there is a problem. The problem resolves itself when additional downloads, consistent with the original Level 0 are downloaded (i.e., Level 2 of 1×1 and Level 1 of 2×2). Accordingly, the original downloaded "Level 1" of 16×16 can be discarded, and temporary memory can be freed. Note, that in this Example the original contiguous memory block, based upon the first level downloaded, was used.

EXAMPLE 4

| Level No. | Level Size (w, h) | Pointer Flag |
| --- | --- | --- |
| 0 | 8 × 8 | 0 |
| 1 | 2 × 2 | 1 |
| 2 | 1 × 1 | 1 |
| 0 | 4 × 4 | 0 |

In Example 4, four level maps, corresponding to Levels 0, 1, 2, and 0 are downloaded, and they are respectively 8×8, 2×2, 1×1, and 4×4 maps. Upon the downloading of the first level map, for Level 0 (i.e., the base map), an entire block of contiguous memory was be allocated. However, as the next level downloaded, was Level 1, and as it had a size which was inconsistent with the Level 0 size, the Level 1 (2×2) data had to be placed into temporary memory, and the pointer flag was set to "1". When the third level, Level 2, was downloaded as a 1×1map, it was also inconsistent with the original Level 0 size, so it was also placed into temporary memory, and the pointer flag was set to "1". Finally, when the fourth level identified itself as (a new) Level 0, and as it was consistent with the other downloaded Levels 1 and 2, the new Level 0, and the previously downloaded Levels 1 and 2 could be placed into contiguous memory in accordance with the present invention.

As will be obvious to those skilled in the art, the present inventive method provides a means for allocating a contiguous memory block for all levels upon the receipt of any level's map. As additional level maps are downloaded, the present invention provides a method for confirming that they are consistent with the prior allocation, or, alternatively, storing their information temporarily until a consistent set of level maps is downloaded. Upon the verification of receipt of a consistent set of level maps, all of the consistent level map data will be in a single contiguous memory block.

I claim:

1. A method for allocating a contiguous block of memory for texel data in a computer graphics system comprising the steps of:

(a) Receiving data corresponding to texel data for a first downloaded level map;

(b) Allocating a block of contiguous memory for a complete MIP map based upon the size and level number of said first downloaded level map;

(c) Determining an offset value into said block of contiguous memory based upon the level number of said texel data for said first downloaded level map, said offset value corresponding to the predetermined location for storing data associated with said first downloaded level map;

(d) Storing said texel data for said first downloaded level map into the location in said block of contiguous memory which is pointed to by said offset value;

(e) Repeatedly receiving additional texel data for additional levels after said first downloaded level data has been received, and for each subsequent level data:

(1) Confirming that it is consistent with the texel data of said first downloaded level data, and, if so, computing an offset into said contiguous memory block and placing the texel data into the location within said contiguous memory block which is pointed to by said offset, or, if not, then placing said newly downloaded texel data into temporary storage and setting a pointer flag to a value indicative of there being texel data in temporary memory;

(2) Repeating step (e)(1) until all of the downloaded texel data is either in a consistent block of contiguous memory or until there is texel data in temporary memory and no more level data is downloaded; then (3) Moving said texel data into contiguous memory from temporary memory if by moving it a consistent set of texel data can thereby be achieved.

\* \* \* \* \*